(12) United States Patent
Balraj

(10) Patent No.: US 9,294,949 B2
(45) Date of Patent: Mar. 22, 2016

(54) INTERFERENCE AND NOISE ESTIMATION OF A COMMUNICATIONS CHANNEL

(75) Inventor: Rajarajan Balraj, Duesseldorf (DE)

(73) Assignee: Intel Deutschland GmbH, Neubiberg (DE)

( * ) Notice: Subject to any disclaimer, the term of this patent is extended or adjusted under 35 U.S.C. 154(b) by 638 days.

(21) Appl. No.: 13/596,305

(22) Filed: Aug. 28, 2012

(65) Prior Publication Data

US 2014/0064106 A1 Mar. 6, 2014

(51) Int. Cl.
*H04J 1/16* (2006.01)
*H04W 24/10* (2009.01)
*H04L 25/02* (2006.01)
*H04B 17/345* (2015.01)

(52) U.S. Cl.
CPC ........... *H04W 24/10* (2013.01); *H04L 25/0248* (2013.01); *H04B 17/345* (2015.01)

(58) Field of Classification Search
CPC .............. H04L 25/021; H04L 25/0242; H04L 25/0204; H04L 25/0224; H04L 25/0202; H04L 25/0248; H04L 25/03178; H04B 7/0851; H04B 7/0634
USPC .................. 370/252, 315; 375/343, 152, 260; 455/296, 63.1
See application file for complete search history.

(56) References Cited

U.S. PATENT DOCUMENTS

2004/0014424 A1* 1/2004 Kristensson et al. ......... 455/63.1
2006/0013292 A1* 1/2006 Despain .......................... 375/152
2006/0023653 A1* 2/2006 Montalbano .................. 370/315
2006/0229051 A1* 10/2006 Narayan et al. .............. 455/296
2008/0279292 A1* 11/2008 Tanabe et al. ................. 375/260
2012/0108194 A1* 5/2012 Lindqvist et al. ............. 455/296
2013/0101060 A1* 4/2013 Cendrillon et al. ........... 375/267

OTHER PUBLICATIONS

Madhow, Upamanyu, et al.; "Differential MMSE: A Framework for Robust Adaptive Interference Suppression for DS-CDMA Over Fading Channels", IEEE Transactions on Communications, vol. 53, No. 8, Aug. 2005, p. 1377-1390.
Yu, Lei, et al.; "SINR Analysis of the Subtraction-Based SMI Beamformer", IEEE Transactions on Signal Processing, vol. 58, No. 11, Nov. 2010, p. 5926-5932.
Davis, Mark, et al.; "A Noise Whitening Approach to Multiple-Access Noise Rejection—Part II: Implementation Issues", IEEE Journal on Selected Areas in Communications, vol. 14, No. 8, Oct. 1996, p. 1488-1499.
Monk, Anton M., et al.; "A Noise-Whitening Approach to Multiple Access Noise Rejection—Part I: Theory and Background", IEEE Journal on Selected Areas in Communications, vol. 12, No. 5, Jun. 1994, p. 817-827.
"Performance of Interference Rejection Combining Receiver for LTE", 3GPP TSG RAN WG4 Meeting #59AH, Bucharest, Romania, Jun. 27-Jul. 1, 2011, p. 1-10.

* cited by examiner

*Primary Examiner* — Dang Ton
*Assistant Examiner* — Lionel Preval
(74) *Attorney, Agent, or Firm* — Eschweiler & Associates, LLC

(57) ABSTRACT

A method of estimating interference and noise of a communications channel includes receiving a data sequence transmitted over the communications channel at a receiver, and computing a sequence of channel estimates based on the received data sequence. The method also includes computing a difference sequence based on the sequence of channel estimates and the sequence of channel estimates subjected to a displacement in time or frequency, and determining a covariance measure of the difference sequence as an estimate of the interference and noise of the communications channel.

20 Claims, 6 Drawing Sheets

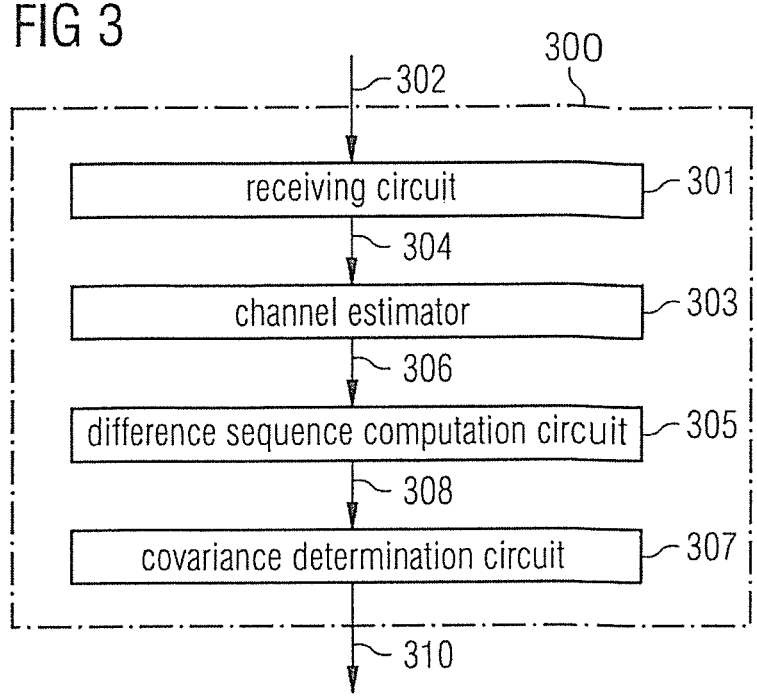
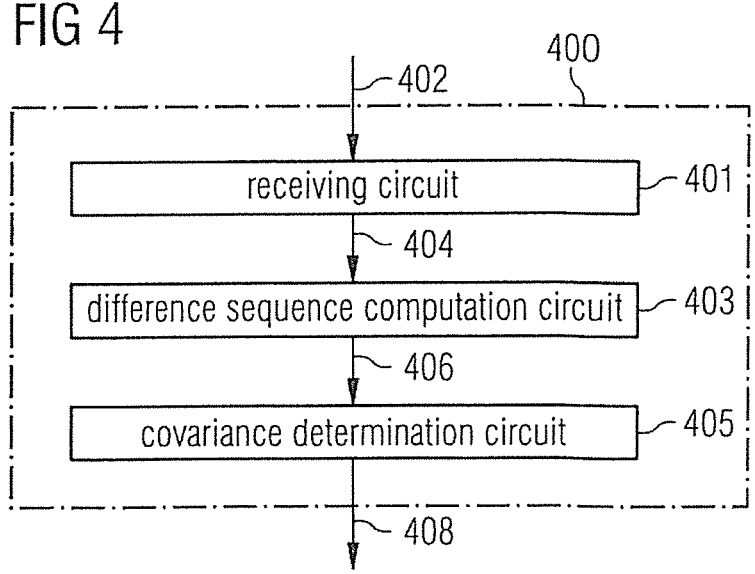

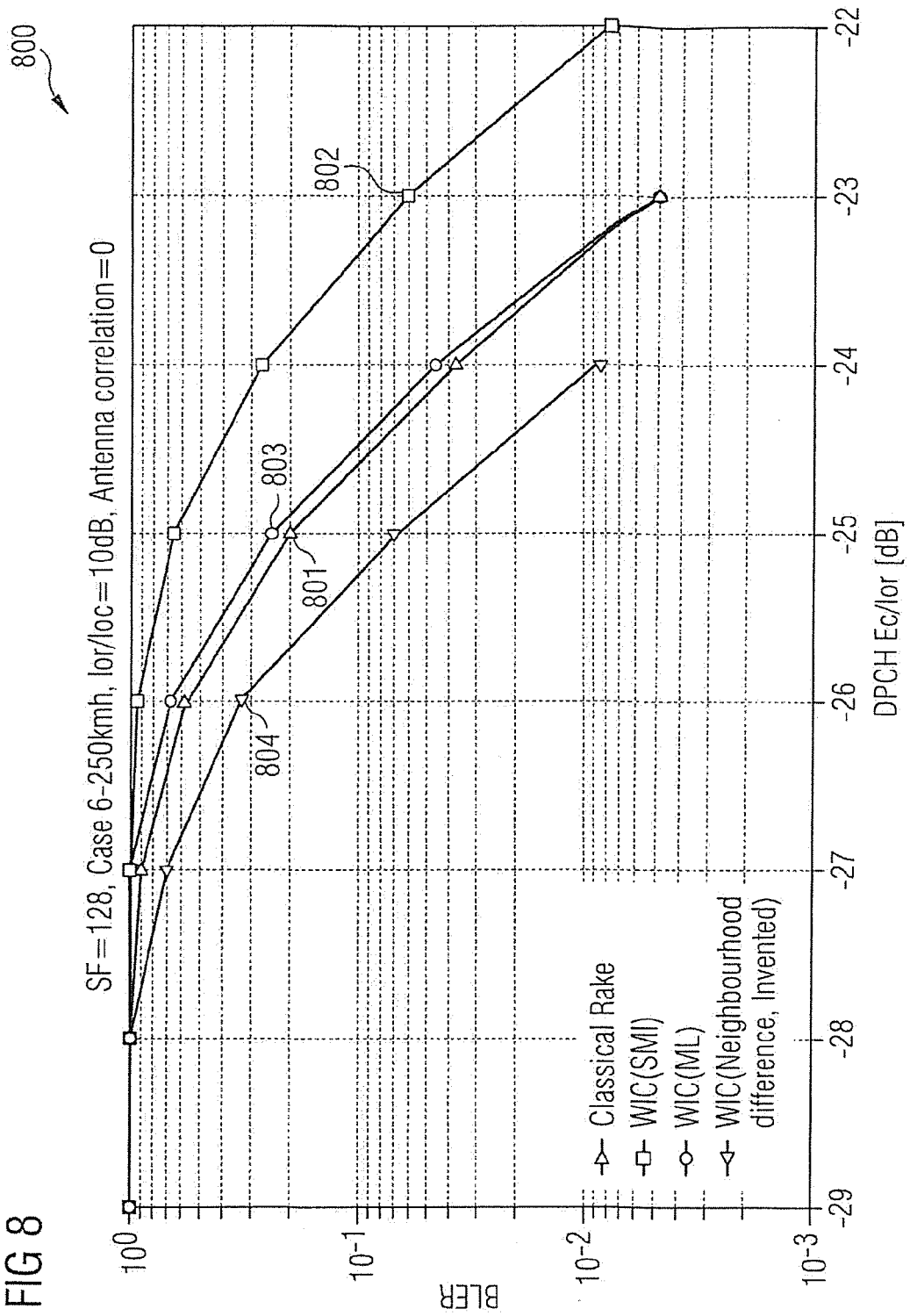

INTERFERENCE AND NOISE ESTIMATION OF A COMMUNICATIONS CHANNEL

FIELD

The invention relates to the technique of estimating interference and noise of a communications channel, in particular of a radio communications channel.

BACKGROUND

The performance of wireless communication is not only limited due to inter-cell interference (ICI). In systems like WCDMA (Wideband Code Division Multiple Access) and LTE (Long Term Evolution), the UE (User Equipment) additionally experiences intra-cell interference due to multi-path and MU-MIMO (Multi-User Multiple Input Multiple Output) interference. Hence, even at high geometries the post-equalization SINR (Signal to Interference plus Noise Ratio) of an interference unaware receiver saturates hence resulting in a high error floor, i.e. in a high block error rate (BLER). In order to guarantee QoS (Quality of Service) the eNodeB (evolved Node B) has to allocate a large fraction of available power or schedule a very low modulation and coding scheme (MCS) and hence reducing cell-edge and cell average throughput. In order to improve the performance, interference aware receivers like interference rejection combining (IRC) or a noise-whitening receiver can be used.

Interference aware receivers suppress the interference and noise vector whose covariance needs to be estimated by a receiver. Receivers employ IRC or noise-whitening methods to estimate the signal covariance matrix.

The quality of the noise covariance estimate often directly depends on the quality of the channel estimates. Existing solutions are designed for static channels, i.e. for flat fading in the frequency domain or time-invariant channels in the time domain. System designers are generally faced with a trade-off between quality of the channel estimate and tracking the channel variations. This limits the applicability of the conventional solutions to low and medium frequency-selective or time varying channels. Conventional solutions for dynamically changing channels show a prohibitively high complexity of the estimation.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

FIG. 3 is a block diagram of an exemplary interference and noise estimator 300 for estimating interference and noise based on a sequence of channel estimates.

FIG. 4 is a block diagram of an exemplary interference and noise estimator 400 for estimating interference and noise based on a received data sequence.

FIG. 8 is a graph 800 that illustrates an exemplary performance of a method of estimating interference and noise for a very high velocity user equipment.

DETAILED DESCRIPTION

Figure 1:
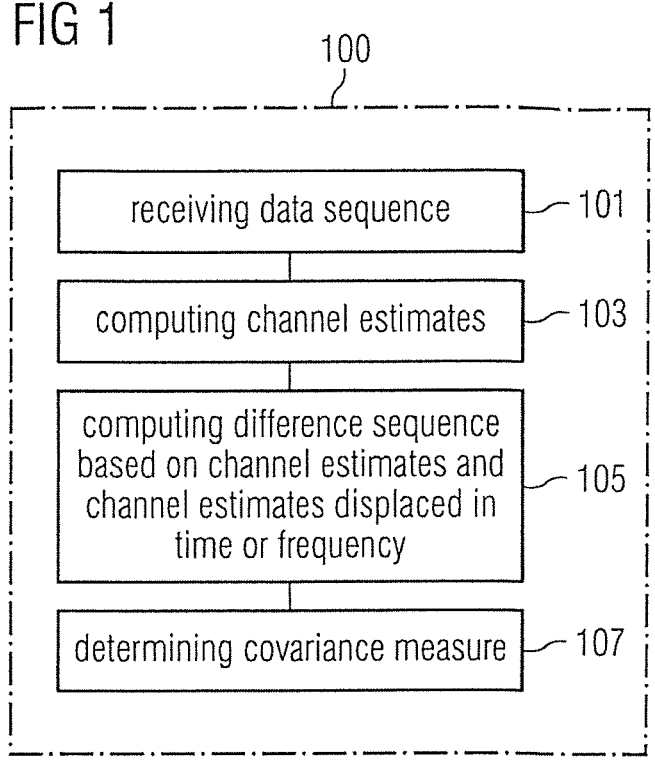
FIG. 1 is a flow chart that schematically illustrates an exemplary method 100 of estimating interference and noise based on a sequence of channel estimates.

In the following detailed description, reference is made to the accompanying drawings, which form a part thereof, and in which is shown by way of illustration specific embodiments in which the invention may be practiced. It is understood that other embodiments may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
ICI: Inter-Cell Interference,
WCDMA: Wideband Code Division Multiple Access,
CDMA: Code Division Multiple Access,
MIMO: Multiple Input Multiple Output,
MU-MIMO: Multi-User Multiple Input Multiple Output,
SINR: Signal to Interference plus Noise Ratio
BLER: Block Error Rate,
QoS: Quality of Service,
eNodeB: evolved Node B,
MCS: Modulation and Coding Scheme,
IRC: Interference Rejection Combining,
ML: Maximum Likelihood,
3GPP: Third Generation Partnership Project,
DL: Downlink,
DC: Direct Current, refers to constant, zero frequency,
LTE: Long Term Evolution,
WiMAX: abbreviation for IEEE 802.16 standard,
WLAN: Wireless Local Area Network,
RF: Radio Frequency,
UE: User Equipment,
UMTS: Universal Mobile Telecommunications System,
P-CPICH: Primary Common Pilot Indicator Channel,
P-CCPCH: Primary Common Control Physical Channel,
SCH: Synchronization Channel,
DPE: Delay Profile Estimator,
DIP: Dominant Interferer Proportion,
PI: Paging Indicator,
PICH: Paging Indicator Channel,
QPSK: Quadrature Phase Shift Keying,
MMSE: Minimum Mean Square Error,
WIC: Wiener Interference Cancellation,
DPCH: Downlink Dedicated Physical Channel,
OCNS: Orthogonal Channel Noise Simulator,
SMI: Sample covariance Matrix Inversion.

In the following, received data sequences, sequences of channel estimates, methods for estimating interference and noise, covariance measures and covariance matrices are described separately or with reference to each other. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary embodiments described herein may be combined with each other, unless specifically noted otherwise.

The received data sequence, the sequences of channel estimates and the interference and noise can be described by the general signal model as described in the following.

The N-dimensional received signal vector y in a particular instant of time or of frequency can be expressed as follows:

$$y = Hx + e \tag{1}$$

where N is the dimension of the received signal, H is the effective channel coefficients of dimension N×M, x is the transmitted signal of dimension M×1 and e is the interference-and-noise vector of dimension N×1.

The covariance matrix $R_e$ of the interference-and-noise vector e can be expressed as follows:

$$R_e = E(ee^H), \tag{2}$$

where E is the expectation operator. The expectation operator can be determined as an average over time or frequency.

The signal plus noise covariance matrix $R_{yy}$ can be estimated by using the channel matrix H, i.e. the matrix of the channel coefficients and the covariance matrix $R_e$ of the interference-and-noise vector e as follows:

$$\begin{aligned} R_{yy} &= E(yy^H) \\ &= E(HH^H) + E(ee^H) \\ &= E(HH^H) + R_e, \end{aligned} \tag{3}$$

The contribution of the estimated covariance matrix $\hat{R}_e$ can be deducted using the estimated channel matrix $\hat{H}$, i.e. the matrix of the estimated channel coefficients from the signal plus noise covariance matrix $R_{yy}$ as follows:

$$\hat{R}_e = R_{yy} - \hat{H}\hat{H}^H, \tag{4}$$

where $\hat{H}$ is the expected channel coefficients matrix and $\hat{R}_e$ is the estimated covariance matrix.

The estimated noise covariance matrix $\hat{R}_e$ can be estimated from the known pilot sequence and the estimated channel matrix $\hat{H}$ as follows:

$$\hat{R}_e = E[(y_p(i) - \hat{H}(i)x_p(i))(y_p(i) - \hat{H}(i)x_p(i))^H], \tag{5}$$

where $\hat{H}(i)$ is the estimated channel coefficients matrix for a particular instant i, $y_p(i)$ is the received pilot signal for a particular instant i, $x_p(i)$ is the known pilot signal for a particular instant i and $\hat{R}_e$ is the estimated covariance matrix.

In the following, communications networks are described. A communications network may comprise a telecommunications network or a computer network or another network for providing communication. A telecommunications network is a collection of terminals, links and nodes which connect to enable telecommunication between users of the terminals. Networks may use circuit switching or message switching. Each terminal in the network must have a unique address so messages or connections can be routed to the correct recipients. The collection of addresses in the network is designated as the address space. The links connect the nodes together and are built upon an underlying transmission network which physically drives the messages across the link.

A telephone network is a telecommunications network used for telephone calls between two or more subscribers. A wireless network is a communications network where the telephones are mobile and can move within a coverage area.

A computer network is a collection of computers and other hardware components interconnected by communication channels to allow sharing of information and resources. Two devices are said to be in a network where at least one process in one device is able to send and/or receive data to/from at least one process in a remote device. A computer network is an interconnection of more than one device interchanging information through a communications medium.

The methods and devices described herein may be implemented in wireless communication, in particular communications transported by communication networks according to an LTE or OFDM standard. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range corresponds to frequencies of alternating current electrical signals used to produce and detect radio waves.

The methods and devices described herein after may be designed to implement and extend mobile standards such as e.g. the wireless LAN (WLAN) radio interfaces IEEE 802.11a, g, n and HIPERLAN/2, the digital radio systems DAB/EUREKA 147, DAB+, Digital Radio Mondiale, HD Radio, T-DMB and ISDB-TSB, the terrestrial digital TV systems DVB-T and ISDB-T, the terrestrial mobile TV systems DVB-H, T-DMB, ISDB-T and MediaFLO forward link, the wireless personal area network (PAN) ultra-wideband (UWB) IEEE 802.15.3a implementation suggested by WiMedia Alliance. The methods and devices may be designed to be used in several 4G and pre-4G cellular networks and mobile broadband standards such as the mobility mode of the wireless MAN/broadband wireless access (BWA) standard IEEE 802.16e (or Mobile-WiMAX) and the mobile broadband wireless access (MBWA) standard IEEE 802.20.

Implementing the standards means that standard compliant devices are interoperable with the methods and devices described herein after. Extending the standards means that methods and devices described herein after improve the standards by providing additional functionality and/or features.

In the following, coherence time and Doppler spread are described. For an electromagnetic wave, the coherence time is the time over which a propagating wave may be considered coherent. In other words, it is the time interval within which its phase is, on average, predictable. In long-distance transmission systems, the coherence time may be reduced by propagation factors such as dispersion, scattering, and diffraction.

In communications systems, a communications channel may change with time. Coherence time $T_c$ is actually a statistical measure of the time duration over which the channel impulse response is essentially invariant, and quantifies the similarity of the channel response at different times. In other words, coherence time is the time duration over which two received signals have a strong potential for amplitude correlation. If the reciprocal bandwidth of the baseband signal is greater than the coherence time of the channel, then the channel will change during the transmission of the baseband message, thus causing distortion at the receiver.

Doppler spread $B_D$ is a measure of the spectral broadening caused by the time rate of change of the mobile radio channel and is defined as the range of frequencies over which the received Doppler spectrum is essentially non-zero. If the baseband signal bandwidth is much greater than $B_D$ the effects of Doppler spread are negligible at the receiver. This is a slow fading channel.

The Doppler spread $B_D$ and coherence time $T_c$ may e.g. be inversely proportional to one another. That is, $T_c=1/B_D$.

FIG. 1 schematically illustrates a method 100 of estimating interference and noise of a communications channel. The method 100 comprises receiving at 101 a data sequence transmitted over the communications channel at a receiver. The method 100 comprises computing at 103 a sequence of channel estimates based on the received data sequence. The method 100 comprises computing at 105 a difference sequence based on the sequence of channel estimates and the sequence of channel estimates subjected to a displacement in time or frequency. The method 100 comprises determining at 107 a covariance measure of the difference sequence as an estimate of the interference and noise of the communications channel.

Pilot signals in communication systems like WCDMA and LTE are densely spaced either in time and/or frequency. Hence the spacing between neighboring pilots in the time or frequency direction is well below the coherence time or frequency, respectively. This implies the channel experienced by neighboring pilots is almost constant.

Computing at 103 a sequence of channel estimates $H(i)$ based on the received data sequence $y_p(i)$ can be described by the following equations:

$$y_p(i-1)=H(i-1)x_p(i-1)+e(i-1)$$

$$y_p(i)=H(i)x_p(i)+e(i), \quad (6)$$

where $y_p(i-1)$ and $y_p(i)$ are received pilot symbols or signals in neighboring instants i−1 and i, i.e. subject to a displacement in time or frequency by one instant, $H(i-1)$ and $H(i)$ are channel coefficients in neighboring instants i−1 and i, i.e. subject to a displacement in time or frequency by one instant, $x_p(i-1)$ and $x_p(i)$ are known pilot symbols or signals in neighboring instants i−1 and i, i.e. subject to a displacement in time or frequency by one instant, and $e(i-1)$ and $e(i)$ are interference and noise experienced in neighboring instants i−1 and i, i.e. subject to a displacement in time or frequency by one instant. The displacement in time or frequency may e.g. be a time delay or a Doppler shift by one or more instants, e.g. a delay by one or more sampling times or clock cycles or a frequency shift by one or more sampling frequencies or multi-carrier frequency subband (or subcarrier) spacing.

Assuming that the channel coefficients in instants i and i−1 are equal, i.e., $H(i) \approx H(i-1)$, the following general estimation method, also called herein the "neighbourhood difference" method, is derived in the following. The neighbourhood difference method is used for the computing at 105 of the difference sequence based on the sequence of channel estimates and the sequence of channel estimates subjected to a displacement in time or frequency.

The following equations are used to describe the estimation of noisy instantaneous channel coefficients, also called the demodulated pilots:

$$H''(i) = y_p(i)\frac{x_p^*(i)}{x_p^*(i)x_p(i)} \quad (7a)$$

$$= H(i) + e(i)\frac{x_p^*(i)}{x_p^*(i)x_p(i)}$$

$$= H(i) + \tilde{e}(i)$$

$$H''(i-1) = y_p(i-1)\frac{x_p^*(i-1)}{x_p^*(i-1)x_p(i-1)}$$

$$= H(i-1) + e(i-1)\frac{x_p^*(i-1)}{x_p^*(i-1)x_p(i-1)}$$

$$H''(i-1) = H(i-1) + \tilde{e}(i-1),$$

where $H''(i)$ and $H''(i-1)$ are the demodulated pilots at instants i and i−1, respectively.

Thus, the received data sequence $y_p(i)$ may be scaled by a scaling function $x_p^*(i)/[x_p^*(i)x_p(i)]$ based on transmitted pilot symbols $x_p(i)$ known at the receiver. The scaling comprises multiplying each element of the received data sequence $y_p(i)$ with the conjugate complex $x_p^*(i)$ of the transmitted pilot symbol $x_p(i)$ known at the receiver. The scaling may further comprise multiplying each element of the received data sequence $y_p(i)$ with an inverse energy $1/[x_p^*(i)x_p(i)]$ of the transmitted pilot symbol $x_p(i)$ known at the receiver.

When using a constant modulus alphabet, the division by the scalar $x_p^*x_p$ can be omitted. Equation (7a) is then modified as follows:

$$H'(i)=y_p(i)x_p^*(i)=H(i)+e(i)x_p^*(i)=H(i)+\tilde{e}(i)$$

$$H'(i-1)=y_p(i-1)x_p^*(i-1)=H(i-1)+e(i-1)x_p^*(i-1)$$

$$H'(i-1)=H(i-1)+\tilde{e}(i-1), \quad (7b)$$

Assuming $H(i) \approx H(i-1)$, the difference sequence $e(i,i-1)$ between the neighboring pilots is computed 105 as follows:

$$e(i,i-1)=H''(i)-H''(i-1)=\tilde{e}(i)-\tilde{e}(i-1), \quad (8)$$

where $e(i,i-1)$ is the computed difference between two neighboring demodulated pilot symbols at instants i and i−1.

The computing at 105 of the difference sequence can be performed by using an FIR filter having the filter function $1-z^{-1}$ (e.g., an FIR filter having a $1-z^{-1}$ structure in a z-domain). For an input $H''(i)$ to the FIR filter, the output is determined as $e(i,i-1)=H''(i)(1-z^{-1})=H''(i)-H''(i-1)$.

The determining at 107 of the covariance measure of the difference sequence as an estimate of the interference and noise of the communications channel can be performed by estimating the covariance matrix $R_{e(i,i-1)}$ of the previously computed difference sequence $e(i,i-1)$ as follows:

$$R_{e(i,i-1)} = E(e(i,i-1)e^H(i,i-1)) \quad (9)$$

$$= E(e(i)e^H(i)) + E(e(i-1)e^H(i-1)) + R_{estbias}$$

$$= 2R_e + R_{estbias}$$

$$\approx 2R_e,$$

where $R_{estbias}$ is the covariance of the estimation bias and is e.g. determined as follows:

$$R_{estbias} = E\left(\sqrt{\sigma_e^2(i)\sigma_e^2(i-1)} \text{ corr}(e(i), e(i-1))\right) \quad (10)$$

$$= E(\sigma_e^2 \text{corr}(e(i), e(i-1)))$$

$R_{estbias}$ may depend on the following factors: $\sigma_e^2$, the power of interference and noise, and corr(e(i),e(i−1)), the cross correlation matrix between e(i) and e(i−1).

The interference and noise covariance matrix $\hat{R}_e$ can e.g. be determined as follows:

$$\hat{R}_e = \tfrac{1}{2} R_{e(i,i-1)} \tag{11}$$

where $\hat{R}_e$ is the estimated interference and noise covariance matrix.

Although the Equations (6) to (11) may describe a method 100 to estimate the covariance matrix $\hat{R}_e$ over pilot signals, one can easily perform the same estimation on data or control signals by replacing $y_p$ and $x_p$ with $y_D$, that is received data or control signal, and $x_D$, that is estimated or known data or a control symbol, respectively.

The assumption that the channel coefficients in instants i and i−1 are equal, i.e., H(i)≈H(i−1), holds if the displacement in time or frequency is smaller than a coherence time or a Doppler spread of the communications channel.

Figure 2:
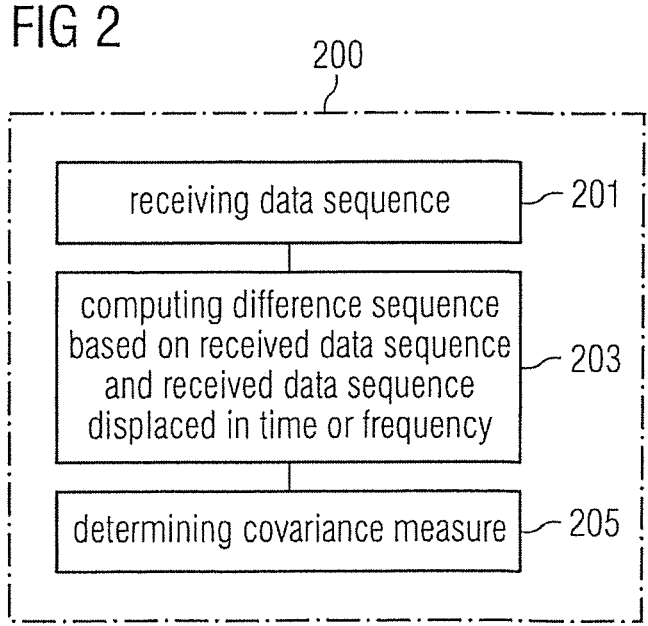
FIG. 2 is a flow chart that schematically illustrates an exemplary method 200 of estimating interference and noise based on a received data sequence.

FIG. 2 schematically illustrates an exemplary method 200 for estimating interference and noise based on a received data sequence. The method 200 comprises receiving at 201 a data sequence transmitted over the communications channel at a receiver. The method 200 comprises computing at 203 a difference sequence based on the received data sequence and the received data sequence subjected to a displacement in time or frequency. The method 200 comprises determining at 205 a covariance measure of the difference sequence as an estimate of the interference and noise of the communications channel.

In communication systems certain signals are always transmitted with the same symbol x in either time or in frequency. Such signals are called signals with infinite repetition. For example, in 3G/WCDMA, the Primary Common Pilot Indicator Channel (P-CPICH) is always transmitted with the same QPSK symbol. For such signals the computation of the demodulated pilots according to equation (6), i.e., the step of computing at 103 a sequence of channel estimates H(i) based on the received data sequence $y_p(i)$ according to the method 100 as described with respect to FIG. 1 may be eliminated and the covariance matrix may be estimated by computing at 203 the difference sequence based on the received data sequence y(i) and the received data sequence subjected to a displacement in time or frequency y(i−1) as follows:

$$e(i, i-1) = y(i) - y(i-1) \tag{12}$$
$$= (H(i)x + e(i)) - (H(i-1)x + e(i-1))$$
$$= e(i) - e(i-1)$$

where y is a received communications signal which is transmitted with the same symbol x.

The above equation (12) computes the difference as in equation (8) of the method 100 described with respect to FIG. 1, but without the knowledge of demodulated pilots, i.e. instantaneous channel coefficients. Thus, channel estimation and the use of channel estimates is not needed. By proceeding further as in equations (9), (10) and (11) of the method 100 described with respect to FIG. 1, the covariance estimate $\hat{R}_e$ may be obtained as described in the following.

The determining at 205 the covariance measure of the difference sequence as an estimate of the interference and noise of the communications channel may be performed by the estimation of the covariance matrix $R_{e(i,i-1)}$ of the previously computed difference sequence e(i,i−1) as follows (cf. equation (9)):

$$R_{e(i,i-1)} = E(e(i, i-1)e^H(i, i-1)) \tag{13}$$
$$= E(e(i)e^H(i)) + E(e(i-1)e^H(i-1)) + R_{estbias}$$
$$= 2R_e + R_{estbias}$$
$$\approx 2R_e,$$

where $R_{estbias}$ is the covariance of the estimation bias and is determined as follows (cf. equation (10)):

$$R_{estbias} = E\left(\sqrt{\sigma_e^2(i)\sigma_e^2(i-1)} \operatorname{corr}(e(i), e(i-1))\right) \tag{14}$$
$$= E(\sigma_e^2 \operatorname{corr}(e(i), e(i-1)))$$

$R_{estbias}$ may depend upon the following factors: $\sigma_e^2$, the power of interference and noise, and corr(e(i),e(i−1)), the cross correlation matrix between e(i) and e(i−1).

The interference and noise covariance matrix $\hat{R}_e$ may be determined as follows (cf. equation (11)):

$$\hat{R}_e = \tfrac{1}{2} R_{e(i,i-1)} \tag{15}$$

where $\hat{R}_e$ is the estimated interference and noise covariance matrix.

While equations (12) to (15) describe a displacement in time or frequency by one instant, the received data sequence y(i) can also be displaced by more than one instant in time or in frequency, e.g. by an integer displacement of N. For example, equation (12) can be written as follows, when a displacement in time or frequency by N instants is applied:

$$e(i, i-N) = y(i) - y(i-N) \tag{16}$$
$$= (H(i)x + e(i)) - (H(i-N)x + e(i-N))$$
$$= e(i) - e(i-N)$$

For a displacement in time or frequency of N instants, it is assumed that the channel coefficients in instants i and i−N are equal, i.e., H(i)≈H(i−N). This may be achieved, for example, by over-sampling the received data sequence y(i) or by using a high sampling frequency for signal reception.

Computing at 203 the difference sequence can be performed by using an FIR filter having the filter function $1-z^{-N}$ (e.g., an FIR filter having a $1-z^{-N}$ structure in a z-domain). For an input y(i) to the FIR filter, the output is determined as $e(i,i-N) = y(i)(1-z^{-N}) = y(i)-y(i-N)$.

In communication systems for certain signals, the symbols are transmitted with a certain repetition factor, i.e., the transmitted symbols x over instants i−n to i are the same. As an example, a signal transmitted with a certain repetition factor, e.g. as multiples of 2, can be split to odd and even instants and the covariance estimate $\hat{R}_e$ can be estimated without the computation of the demodulated pilots as described in the following. Computing 203 the difference sequence based on the received data sequence y(i) and the received data sequence subjected to a displacement in time or frequency y(i−1) can be described as follows:

$$e(i_{odd}, i_{even}) = y(i_{odd}) - y(i_{even}) = e(i_{odd}) - e(i_{even}) \tag{17}$$

where $e(i_{odd}, i_{even})$ describes the difference sequence based on the received data sequence $y(i_{odd})$ and the received data sequence displaced in time or frequency $y(i_{even})$.

Determining at 205 the covariance measure of the difference sequence $e(i_{odd}, i_{even})$ can be performed as follows:

$$\hat{R}_e = \tfrac{1}{2} E(e(i_{odd}, i_{even}) e^H(i_{odd}, i_{even})) \quad (18)$$

In equation (18) shown above the complexity of the covariance matrix estimation is halved since only one matrix multiplication is done for every two received signals. This computation can also be applied to signals with infinite repetition as described above with respect to equation (12).

In communication systems for certain signals, the symbols x may e.g. be transmitted with a certain repetition factor, e.g. by multiples of 2, and additionally no valid symbols are transmitted. Hence, only noise and interference is present in these time and/or frequency instants where no valid symbols are transmitted. As a classical example, for the Paging Indicator Channel (PICH) in WCDMA the PI symbols are transmitted with certain repetition, e.g. 2, 4, 8, etc. and in some time instants no valid symbols are transmitted. Since the receiver knows the repetition factor which is e.g. a multiple of 2, the covariance estimate can also be estimated by splitting the signals into odd and even positions as described in the following.

For time instants with valid transmitted symbols, the computing at 203 the difference sequence is as follows:

$$\begin{aligned} e(i_{odd}, i_{even}) &= y(i_{odd}) - y(i_{even}) \quad (19) \\ &= (H(i_{odd})x + e(i_{odd})) - (H(i_{even})x + e(i_{even})) \\ &= e(i_{odd}) - e(i_{even}) \end{aligned}$$

For time instants with no valid transmitted symbols, the computing at 203 the difference sequence is e.g. as follows:

$$\begin{aligned} e(i_{odd}, i_{even}) &= y(i_{odd}) - y(i_{even}) \quad (20) \\ &= e(i_{odd}) - e(i_{even}) \end{aligned}$$

Determining at 205 the covariance measure is e.g. as follows:

$$\hat{R}_e = \tfrac{1}{2} E(e(i_{odd}, i_{even}) e^H(i_{odd}, i_{even})) \quad (21)$$

Although one application of the covariance estimation methods as described with respect to FIGS. 1 and 2 is interference suppression, it is also possible to apply the covariance estimate to channel quality estimation and MMSE channel estimation.

For channel quality estimation, in many communication systems the UE may need to feedback the estimated channel quality, e.g. the signal-to-interference-and-noise ratio (SINR) to the base station or (e)NodeB to facilitate link adaptation. The covariance matrix estimation according to one of the methods 100 or 200 as described with respect to FIGS. 1 and 2 can also be applied to compute the SINR.

Channel estimation, e.g. MMSE channel estimation, may use the noise covariance to estimate channel coefficients. The methods 100 or 200 as described with respect to FIGS. 1 and 2 can also be applied to provide that noise covariance to be used for channel estimation. Since the methods 100, 200 represent a blind covariance estimation technique, they can be applied for channel estimation, e.g. MMSE channel estimation, under severe co-channel interference conditions.

FIG. 3 illustrates a block diagram of an exemplary interference and noise estimator 300 for estimating interference and noise based on a sequence of channel estimates. The interference and noise estimator 300 comprises a receiving circuit 301, a channel estimator 303 coupled to the receiving circuit 301, a difference sequence computation circuit 305 coupled to the channel estimator 303 and a covariance determination circuit 307 coupled to the difference sequence computation circuit 305.

The receiving circuit 301 is configured to receive a data sequence 302 transmitted over a communications channel, wherein a data sequence 304 represents the sequence 302 as received. The channel estimator 303 is configured to compute a sequence of channel estimates 306 based on the received data sequence 304. The difference sequence computation circuit 305 is configured to compute a difference sequence 308 based on the sequence of channel estimates 306 and the sequence of channel estimates 306 subjected to a displacement in time or frequency. The covariance determination circuit 307 is configured to determine a covariance measure 310 of the difference sequence 308. The covariance measure 310 is provided at an output of the interference and noise estimator 300.

The interference and noise estimator 300 is configured to perform the method 100 as described with respect to FIG. 1. Thus, the receiving circuit 301 may perform receiving at 101 a data sequence as described with respect to FIG. 1. The channel estimator 303 may perform computing at 103 channel estimates as described with respect to FIG. 1. The difference sequence computation circuit 305 may perform computing at 105 a difference sequence based on the sequence of channel estimates and the sequence of channel estimates subjected to a displacement in time or frequency as described with respect to FIG. 1. The covariance determination circuit 307 may perform determining at 107 a covariance measure of the difference sequence as described with respect to FIG. 1.

FIG. 4 illustrates a block diagram of an exemplary interference and noise estimator 400 for estimating interference and noise based on a received data sequence 402. The interference and noise estimator 400 comprises a receiving circuit 401, a difference sequence computation circuit 403 coupled to the receiving circuit 401, and a covariance determination circuit 405 coupled to the difference sequence computation circuit 403.

The receiving circuit 401 is configured to receive a data sequence 402 transmitted over a communications channel, wherein a data sequence 404 represents the sequence 402 as received. The difference sequence computation circuit 403 is configured to compute a difference sequence 406 based on the received data sequence 404 and the received data sequence 404 subjected to a displacement in time or frequency. The covariance determination circuit 405 is configured to determine a covariance measure 408 of the difference sequence 406. The covariance measure 408 is provided at an output of the interference and noise estimator 400.

The interference and noise estimator 400 may be configured to perform the method 200 as described with respect to FIG. 2. Thus, the receiving circuit 401 may perform receiving at 201 a data sequence as described with respect to FIG. 2. The difference sequence computation circuit 403 may perform computing at 203 a difference sequence based on the sequence of channel estimates and the sequence of channel estimates subjected to a displacement in time or frequency as described with respect to FIG. 2. The covariance determination circuit 405 may perform determining at 205 a covariance measure of the difference sequence as described with respect to FIG. 2.

Figure 5:
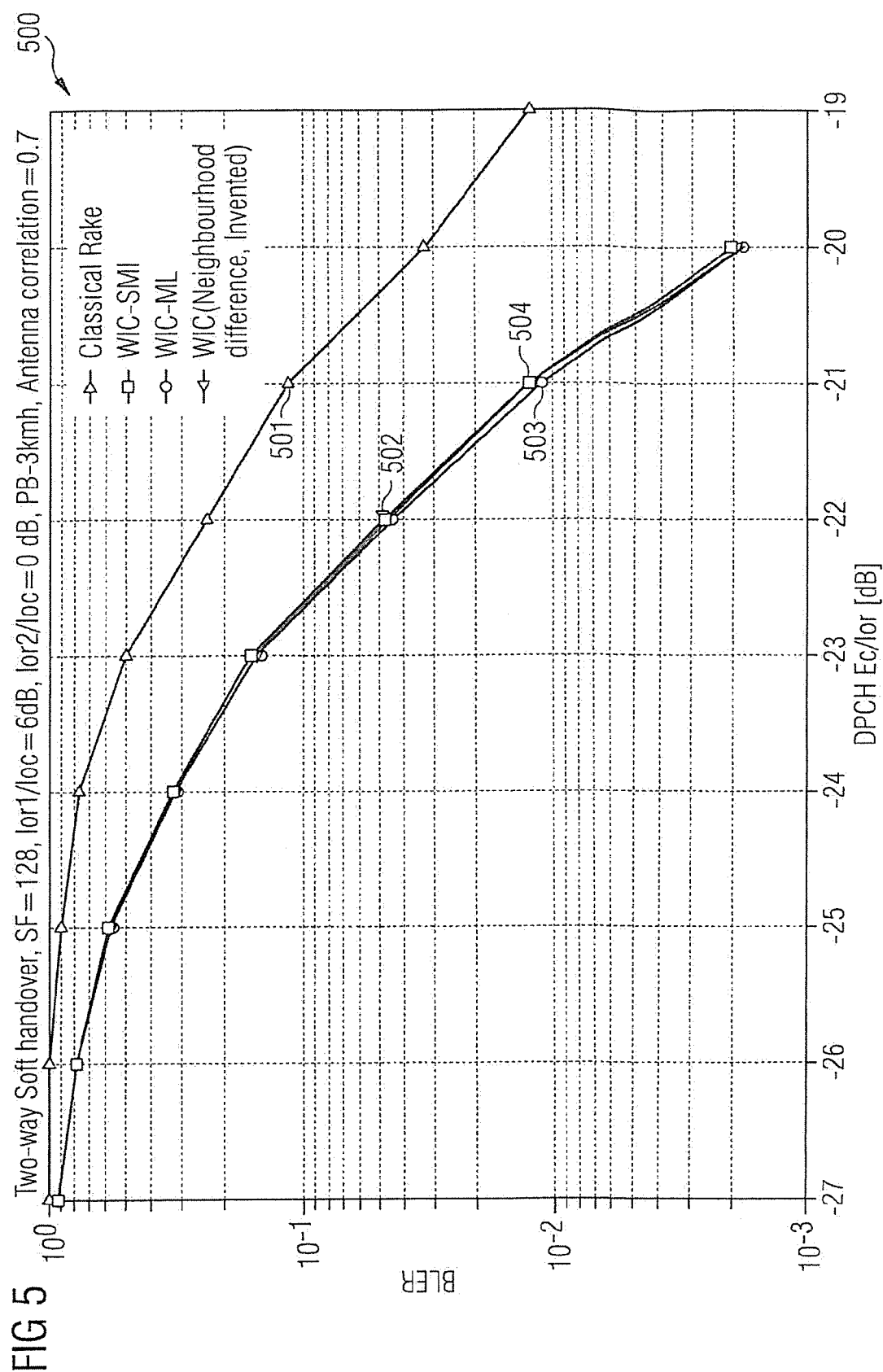
FIG. 5 is a graph 500 that illustrates an exemplary performance of a method of estimating interference and noise for a slow velocity user equipment.

FIG. 5 is a graph 500 that illustrates an exemplary performance of a method for estimating interference and noise for a slow velocity user equipment.

Matlab floating point simulations are performed with Wiener Interference Cancellation (WIC) as described in US patent application US 2009/0238246 A1 with different conventional covariance estimation methods and with the covariance estimation method according to embodiments described with respect to FIGS. 1 and 2, called "Neighborhood difference" method herein after. For comparing the interference suppression capabilities of different estimation methods a conventional rake receiver "classical rake" was also simulated with the following simulation settings:
simulated standard: 3G/Release.99
5000 Frames
UMTS base station with OCNS and control channels (PICH, P-CCPCH & SCH)
Spreading factor 128
Interference model based on 3GPP 25.963 (3 interfering eNodeB with DIP→[−2.75, −7.64, −8.68] dB)
Channel estimation→Estimated channel based on P-CPICH Practical Delay Profile Estimator (DPE)

In FIG. 5, the first curve 501 describes the performance in terms of block error rate (BLER) of the conventional rake receiver "Classical Rake" 501 for a DPCH channel's relative power ratio to the total transmit power spectral density (Ec/Ior). The second curve 502 describes the performance of a conventional Wiener Interference Cancellation receiver applying sample covariance matrix inversion (SMI). The third curve 503 describes the performance of a conventional Wiener Interference Cancellation receiver applying Maximum Likelihood (ML). The fourth curve 504 describes the performance of the neighborhood difference method. FIG. 5 describes a scenario of slow channel variation, i.e., two-way soft handover with pedestrian-B and a UE velocity of 3 km/h.

Figure 6:
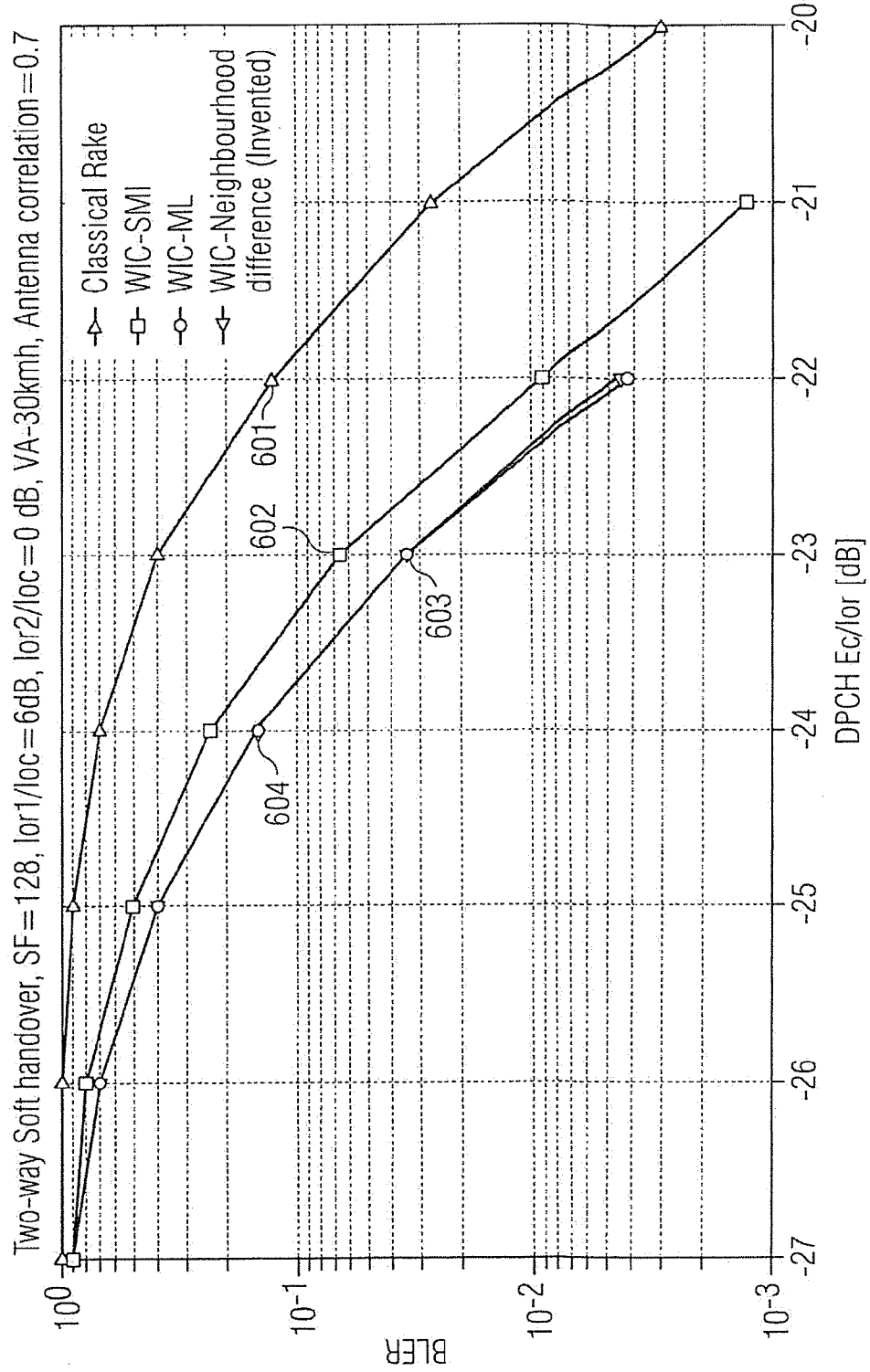
FIG. 6 is a graph 600 that illustrates an exemplary performance of a method of estimating interference and noise for a medium velocity user equipment.

The FIGS. 5 and 6 depict the performance of the conventional estimation method and the neighborhood difference method in low and medium speeds. As can be seen from the figures, the conventional estimators perform well in slow dynamically changing channels and it can be observed that the neighborhood difference method performs at least as good as the conventional methods, in some cases better. All the estimation methods provide gains of 1.8 dB over a conventional rake receiver.

FIG. 6 is a graph 600 that illustrates an exemplary performance of a method for estimating interference and noise for a medium velocity user equipment.

In FIG. 6, the first curve 601 describes the performance in terms of block error rate (BLER) of the conventional rake receiver "Classical Rake" 601 for a DPCH channel's relative power ratio to the total transmit power spectral density (Ec/Ior). The second curve 602 describes the performance of a conventional Wiener Interference Cancellation receiver applying sample covariance matrix inversion (SMI). The third curve 603 describes the performance of a conventional Wiener Interference Cancellation receiver applying Maximum Likelihood (ML). The fourth curve 604 describes the performance of the neighborhood difference method. FIG. 6 describes a scenario of medium channel variation, i.e., two-way soft handover with vehicular-A and a UE velocity of 30 km/h.

As can be seen from FIG. 6, the conventional estimators still perform well in medium dynamically changing channels and it can be observed that the neighborhood difference method performs better than the conventional rake receiver 601, performs better than the conventional WIC SMI receiver and performs at least as good as the conventional WIC ML receiver.

Figure 7:
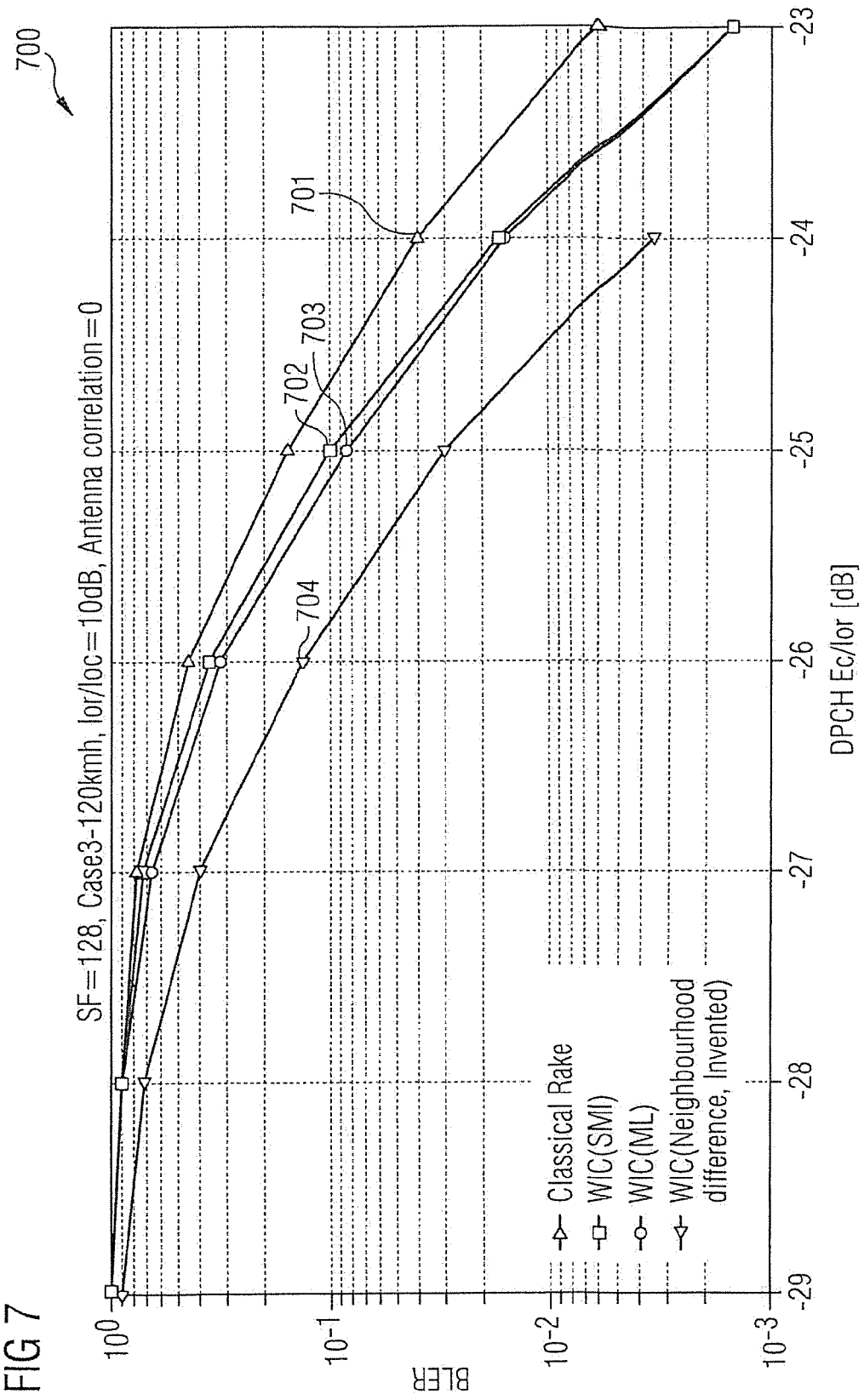
FIG. 7 is a graph 700 that illustrates an exemplary performance of a method of estimating interference and noise for a high velocity user equipment.

FIG. 7 is a graph 700 that illustrates an exemplary performance of a method for estimating interference and noise for a high velocity user equipment.

The advantage of the neighborhood difference method is clearly visible in high velocity channels as depicted in FIGS. 7 and 8. The estimator according to the neighborhood difference method still provides a gain about 0.7 to 1.2 dB, but the performance gain of conventional estimators either vanishes or they perform worse than a rake receiver.

In FIG. 7, the first curve 701 describes the performance in terms of block error rate (BLER) of the conventional rake receiver "Classical Rake" 701 for a DPCH channel's relative power ratio to the total transmit power spectral density (Ec/Ior). The second curve 702 describes the performance of a conventional Wiener Interference Cancellation receiver applying sample covariance matrix inversion (SMI). The third curve 703 describes the performance of a conventional Wiener Interference Cancellation receiver applying Maximum Likelihood (ML). The fourth curve 704 describes the performance of the neighborhood difference method. FIG. 7 describes a scenario of high channel variation, i.e., a UE velocity of 120 km/h. The estimator according to the neighborhood difference 704 shows a superior performance compared to conventional estimators 701, 702, 703.

FIG. 8 is a graph 800 that illustrates an exemplary performance of a method for estimating interference and noise for a very high velocity user equipment.

In FIG. 8, the first curve 801 describes the performance in terms of block error rate (BLER) of the conventional rake receiver "Classical Rake" 801 for a DPCH channel's relative power ratio to the total transmit power spectral density (Ec/Ior). The second curve 802 describes the performance of a conventional Wiener Interference Cancellation receiver applying sample covariance matrix inversion (SMI). The third curve 803 describes the performance of a conventional Wiener Interference Cancellation receiver applying Maximum Likelihood (ML). The fourth curve 804 describes the performance of the neighborhood difference method. FIG. 8 describes a scenario of very high channel variation, i.e., a UE velocity of 250 km/h. The estimator according to the neighborhood difference 804 shows a superior performance compared to conventional estimators 801, 802, 803.

The FIGS. 5 to 8 prove that the estimator according to the neighborhood difference method is a robust estimator showing best in class performance for low, medium and especially dynamically varying channels. The estimator according to the neighborhood difference method can be applied to a wide range of communication signals enabling interference suppression in conditions where conventional estimators fail. The quality of the noise covariance matrix estimate is not dependent upon the quality of the channel estimates.

In other words, the estimator according to the neighborhood difference method provides a robust covariance matrix estimation method which utilizes densely spaced signals in communication systems. According to an embodiment, the model of the neighborhood difference estimator comprises computing the difference between neighboring demodulated signals as described in equations (7a) or (7b) and (8), and computing the covariance of the signal difference and hence estimating the interference-and-noise covariance matrix as described in equations (9), (10) and (11).

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of estimating interference and noise of a communications channel, comprising:
    receiving a data sequence transmitted over the communications channel at a receiver;
    computing a sequence of channel estimates based on the received data sequence;
    computing a difference sequence based on the sequence of channel estimates and the sequence of channel estimates subjected to a displacement in time or frequency;
    determining a covariance measure of the difference sequence as an estimate of the interference and noise of the communications channel;
    filtering the sequence of channel estimates by a finite impulse response (FIR) filter,
    wherein the FIR filter has a structure in a z-domain of $1-z^{-N}$, where N designates a displacement in time in units of symbol duration or a displacement in units of subcarrier spacing.

2. The method of claim 1, wherein the displacement in time or frequency is smaller than a coherence time or a Doppler spread of the communications channel.

3. The method of claim 1, wherein computing the sequence of channel estimates comprises:
    scaling the received data sequence by a scaling function based on transmitted pilot symbols known at the receiver.

4. The method of claim 3, wherein the scaling comprises:
    multiplying each element of the received data sequence with a complex conjugate of the transmitted pilot symbol known at the receiver.

5. The method of claim 1, wherein the received data sequence is provided by a Primary Common Pilot Indicator Channel according to a 3G/WCDMA specification.

6. The method of claim 1, wherein computing the sequence of channel estimates comprises:
    scaling the received data sequence by a scaling function based on control symbols estimated or known at the receiver or on data symbols estimated or known at the receiver.

7. The method of claim 6, wherein the scaling comprises:
    multiplying each element of the received data sequence with a complex conjugate of the control symbol estimated or known at the receiver or of the data symbol estimated or known at the receiver.

8. The method of claim 1, wherein the covariance measure is a covariance matrix formed from elements of the difference sequence.

9. A method of estimating interference and noise of a communications channel, the method comprising:
    receiving a data sequence transmitted over the communications channel at a receiver;
    computing a difference sequence based on the received data sequence and the received data sequence subjected to a displacement in time or frequency; and
    determining a covariance measure of the difference sequence as an estimate of the interference and noise of the communications channel,
    wherein the received data sequence contains repeatedly transmitted first blocks of same transmitted symbols and repeatedly transmitted second blocks in which no symbols are transmitted, and wherein the difference sequence is determined based on the first and second blocks of the received data sequence.

10. The method of claim 9, wherein the received data sequence corresponds to a transmitted data sequence containing identical data symbols.

11. The method of claim 9, wherein the received data sequence corresponds to a transmitted data sequence containing repeatedly transmitted blocks of identical symbols, and wherein the difference sequence is determined based on subsequent blocks of the received data sequence.

12. The method of claim 9, wherein the received data sequence is provided by a Paging Indicator Channel according to a 3G/WCDMA specification.

13. The method of claim 9, wherein computing the difference sequence comprises:
    filtering the received data sequence by a finite impulse response (FIR) filter.

14. The method of claim 13, wherein the FIR filter has a structure in a z-domain of $1-z^{-N}$, where N designates a displacement in time in units of symbol duration or a displacement in units of subcarrier spacing.

15. The method of claim 9, wherein the covariance measure is a covariance matrix formed from elements of the difference sequence.

16. The method of claim 9, further comprising:
    estimating channel coefficients of the communications channel by using the covariance measure.

17. An interference and noise estimator for estimating interference and noise of a communications channel, the interference and noise estimator comprising:
    a receiving circuit configured to receive a data sequence transmitted over the communications channel;
    a channel estimator configured to compute a sequence of channel estimates based on the received data sequence from the receiving circuit;
    a difference sequence computation circuit configured to compute a difference sequence based on the sequence of channel estimates and the sequence of channel estimates subjected to a displacement in time or frequency from the channel estimator;
    a covariance determination circuit configured to determine a covariance measure of the difference sequence from the difference sequence computation circuit; and
    a scaling circuit configured to scale the received data sequence by a scaling function based on transmitted pilot symbols or on control symbols estimated or known at the receiving circuit or on data symbols estimated or known at the receiving circuit, and wherein the scaled data sequence is employed by the channel estimator to compute the sequence of channel estimates.

18. The interference and noise estimator of claim 17, wherein the difference sequence computation circuit comprises a finite impulse response (FIR) filter configured to filter the sequence of channel estimates to provide the difference sequence.

19. An interference and noise estimator for estimating interference and noise of a communications channel, the interference and noise estimator comprising:
   a receiving circuit configured to receive a data sequence transmitted over the communications channel;
   a difference sequence computation circuit configured to compute a difference sequence based on the received data sequence and the received data sequence subjected to a displacement in time or frequency from the receiving circuit; and
   a covariance determination circuit configured to determine a covariance measure of the difference sequence from the difference sequence computation circuit,
   wherein the received data sequence contains repeatedly transmitted first blocks of same transmitted symbols and repeatedly transmitted second blocks in which no symbols are transmitted, and wherein the difference sequence is determined based on the first and second blocks of the received data sequence.

20. The interference and noise estimator of claim 19, wherein the difference sequence computation circuit comprises a finite impulse response (FIR) filter configured to filter the received data sequence to provide the difference sequence.

* * * * *